Oct. 15, 1940.                H. DEUTSCH                 2,218,036
                              SAFETY DEVICE
                           Filed April 22, 1938
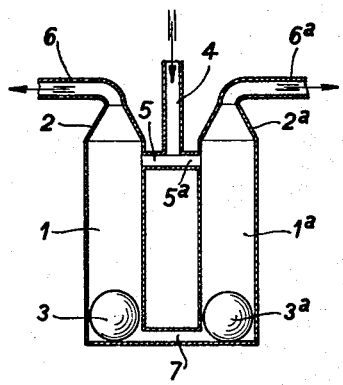
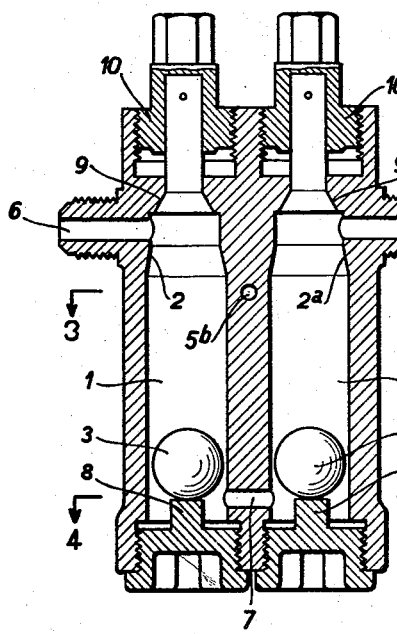
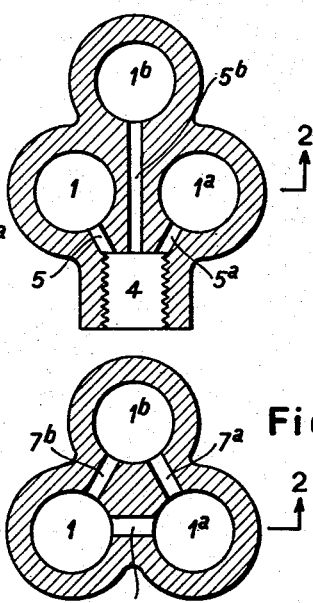

Patented Oct. 15, 1940

2,218,036

UNITED STATES PATENT OFFICE 2,218,036

SAFETY DEVICE

Hans Deutsch, Vienna, Germany, assignor to the firm of Alex. Friedmann, Vienna, Germany Application April 22, 1938, Serial No. 203,651
In Austria April 27, 1937

1 Claim. (Cl. 303—84)

This invention relates to safety devices for installations or plants of every kind in which hydraulic power transmission takes place and is especially applicable for hydraulic brake installations of cars; it has for its purpose to cut off a part of the whole installation, which may be out of order on account of a break or leakage in a pipe or the like, from the remaining part of the installation in a fluid tight manner by means of a valve so that the operation of the uninjured part of the installation may not be impaired by fluid losses or by the loss of pressure in the injured part of the installation.

Safety devices of the above mentioned type have already been proposed, which comprise a bent channel with restricted upper ends connected with the working cylinder or cylinders forming a seat for a valve preferably a ball shaped valve, which is carried towards its seat on one of the restricted channel ends with the fluid when it is in motion. In the lower bent part of the channel the fluid is generally at rest when the installation is in good order. Whenever a leakage occurs however a movement of the fluid also in said lower part of the channel towards the point where the leakage takes place is the consequence; the valve is then carried towards the seat connected with the injured part of the installation and shuts off this part.

Installations operating according to this principle have, however, the drawback that the ball valve can also move towards the restricted end of the channel provided with the valve seat when the installation with the safety device assumes an inclined position towards the horizontal. For instance, an installation on a vehicle will assume different inclinations towards a vertical line during its travel. The lowest point of the bent channel and therefore the position of rest of the valve is altered by virtue of such inclinations of the vehicle and in the event of the vehicle running along a steep road, this may lead to a closure of one part of the hydraulic installation by the valve without any injuring of one part thereof.

A further drawback is that particles of foreign matter which are always present in the fluid in spite of every precaution will form a sediment at the lowest point of the channel, i. e. in the lowest part of its bend. After some time, this condition may cause the ball valve to jam in this part of the channel which must be calibrated as well as its upwardly directed parts.

Another drawback of an installation of this type, in which the point of rest varies with the inclination, is the fact that the permanent movement of the ball shaped valve causes wear and this will lower the sensitivity of the whole apparatus.

In another known type of safety devices an upwardly directed channel is inserted in every pipe leading to a working cylinder or a group of working cylinders and a ball shaped valve is moving within said channel with a certain clearance, the seat for said ball valve being provided at the upper end of the channel while the fluid under pressure enters at the lower end of the channel or in vicinity thereto. The ball shaped valve moves with the fluid that enters the working cylinder or cylinders but reaches the seat at the end of the channel only, when an excessive quantity of fluid is flowing through the apparatus as will be the case in the event of leakage or the like.

This type of safety devices has, however, the disadvantage that the ball shaped valve must permanently move within the channel when the working cylinders are operated. This leads to wear of the parts and decreases the sensitivity of the apparatus. Moreover, the channel must have an accurately dimensioned length in order that the ball valve may not reach its seat during normal operation, even if such operation takes place with the largest possible quantity of fluid, while if this maximum quantity of fluid moving towards the cylinder or cylinders is exceeded, the ball valve should reach its seat at the end of the channel and seal the pipe which is leading to the injured part. The greatest accuracy as regards the dimensions of the channels and individual adjustment are, therefore, necessary.

According to this invention all these drawbacks are obviated. The invention makes use of a channel for each working cylinder or for each group of working cylinders, which is upwardly directed and provided at its upper and restricted end with a seat for a ball valve inserted with a certain clearance into the channel. The opening around which the seat is provided is connected with the working cylinder or working cylinders and a lateral opening below the seat is connected with the source of pressure.

According to the invention the lower ends of the various channels are moreover connected with each other in such a manner that the fluid can penetrate into the lower connections only from the upwardly directed channels. The ball valve within a channel can, therefore, be set into motion upon operation of the working cylinders only insofar as a difference exists between the fluid quantities which are flowing to the working points, where the fluid is utilised. It is not possible that the ball valve may swing around a position on account of various inclinations of the channels. When the quantities of fluid which are flowing to the points of utilisation are approximately equal as is generally the case in installations of this kind the valve bodies in the channels will remain at rest during the operation, whatever the position of the installation. Therefore, no wear of the parts takes place even after a very long use; moreover, the length of the upwardly directed channel may be relatively short, which is a further advantage. Moreover, sediments will only form in the lower part of the channels on or below the lower stops for the ball valves. They can never hamper the free upward movement of a ball valve towards its seat.

In the accompanying drawing the invention is illustrated by way of example. Fig. 1 shows a diagram while Figs. 2, 3 and 4 are illustrating a modification of the invention in longitudinal section and in two horizontal sections respectively. The longitudinal section illustrated in Fig. 2 is drawn along line 2—2 of Figs. 3 and 4. The horizontal section shown in Fig. 3 is drawn along line 3—3 of Fig. 2. The horizontal section shown in Fig. 4 is drawn along line 4—4 of Fig. 2.

In all the various figures similar parts are designated with similar reference letters.

The safety device according to Fig. 1 is provided with two upwardly directed channels 1, 1ª, each having a conical valve seat 2 and 2ª at its upper end. In each channel a ball valve 3 and 3ª respectively is arranged which is inserted into the channel with a certain clearance obtained by using a ball valve of a diameter smaller than the cross section of the channel.

Fluid under pressure is admitted through a pipe 4 which is divided into two branches 5 and 5ª. By means of these branches the fluid is conducted from the source of pressure into the channels 1, 1ª immediately below the conical valve seats 2 and 2ª. Pipes 6 and 6ª respectively are leading from the openings in the valve seat 2 and 2ª away to the various working cylinders or groups of working cylinders to which the fluid under pressure is to be supplied. The two lower ends of the channels 1, 1ª are also in communication with each other below the lowermost positions of the two balls 3 and 3ª by means of the channel 7.

The operation of the device is the following:

When the hydraulic installation is set into operation fluid under pressure will flow from the source of said fluid through the pipe 4 and through the two branches 5 and 5ª into the two channels 1 and 1ª. In accordance with the capacity of the working cylinders to which the fluid is admitted given quantities of fluid will flow through the pipes 6 and 6ª over the openings in the valve seats 2 and 2ª. A movement of the ball valve 3 or 3ª can only occur when the capacity of the two working cylinders as regards the admission of fluid under pressure differs very much.

Assuming the working cylinder or group of working cylinders which are connected with pipe 6 to have a greater capacity for admitting or consuming fluid than the cylinder or group of cylinders connected with the pipe 6ª, then the quantity of fluid which corresponds to this difference will flow downwardly from the pipe 4 over the branch pipe 5ª into the channel 1ª and will then by way of the clearance space between the ball valve 3ª and the walls of the channel 1ª flow into the channel 7 and will thus be pressed under the ball valve 3 and flow upwardly in the channel 1. The ball valve 3 is thus lifted to a certain height.

In ordinary hydraulic plants differences of this kind between the consumption of fluid in the various cylinders or cylinder groups are easily avoidable and it is practically always possible to make the capacity of the two groups of working cylinders or of the two working cylinders approximately equal. In this case the movements of the two ball valves 3 or 3ª during the normal working of the plant are very slight. No wear of the ball valves or of the channel walls occurs with this type of safety device during the normal working of the same. An inclined position of the installation cannot cause any movement of the ball valves 3 or 3ª, and sediments will settle in the lower part of the channels 1 and 1ª and never hamper the free movement of the ball valves 3, 3ª in an upward direction towards the valve seats 2, 2ª.

Assuming now that one of the pipes or one of the cylinders or any part of the whole installation that is connected with the pipe 6 is injured or broken then the flow of fluid through the channel 1 from the lower end to the upper end of the channel will last as long as the source of pressure fluid will supply fluid through the pipe 4 to the channels 1 and 1ª; the ball valve 3 will be carried upwardly until it reaches the conical seat 2 and will be firmly pressed against this seat and will be fixed tightly at this place, so as to close the pipe 6. That part of the installation which is in connection with said pipe is thus permanently separated from the uninjured part of the installation which is connected with the pipe 6ª and thus the uninjured part remains in good working condition unimpaired by the leakage, downbreak or injuring of the other part of the installation.

In Figs. 2, 3 and 4 a modification of the safety device is shown which comprises three upwardly directed channels. Each of these channels 1, 1ª, 1ᵇ (Figs. 3 and 4) is provided with a conical seat 2 and 2ª respectively, in the same manner as shown in Fig. 2 for the channels 1, 1ª. At the lower end of the channel a stop 8, 8ª is provided for the ball valves 3, 3ª etc. which determines the lowest position of the ball in each channel. Below the valve seats 2, 2ª etc. the branches 5, 5ª, 5ᵇ are leading from the pipe 4 connected with the pressure source into the channels 1, 1ª, 1ᵇ, while the lower ends of the channels 1, 1ª, 1ᵇ are connected by bores 7, 7ª, 7ᵇ (Figs. 2 and 4) with each other at a point which is lower than the lowest position the ball valves may assume. With the pipes 6, 6ª etc. the working cylinders or groups of working cylinders are in operative connection. The operation of the safety device is similar to that which has been described in connection with the diagrammatic Fig. 1.

If that part of the plant which is connected with the pipe 6 is injured or has developed a leakage the ball valve 3 will be carried upwardly until it reaches the seat 2 and will be held fast and fix itself in this position, so that it will close permanently the connection with the injured part of the installation and will separate it from that part which is still in good working condition. After repair of the damage done or of the leak the ball will be returned by means of the pin 9 which by screwing down the threaded part 10 may be moved through the opening of the seat 2 and thus presses the ball valve away from its seat 2 so that it is free to sink again into its lowermost position within the channel 1. After the return of the ball valve the whole installation is again in good working condition. Each channel 1, 1ᵃ, 1ᵇ is provided with one of these removing devices 9, 10 or 9ᵃ, 10ᵃ respectively.

Other modifications may be made without departing from the scope of the invention.

What I claim is:

A safety device for installations for transmitting power by means of fluid pressure, comprising a plurality of upwardly directed channels, a valve body inserted in each of said channels with a clearance, a valve seat at the upper end of each of said channels for the valve body inserted in the respective channel, each of said valve seats being directed towards the interior of said channel and encircling an opening leading to the working cylinder or cylinders of the installation, a stop in the lower part of each channel for the valve body inserted in it, all of said upwardly directed channels being in permanent and open connection with the source of pressure only at their upper ends below said valve seats, while at their lower ends said channels are only connected with one another in proximity to said lower stops for said valve bodies.

HANS DEUTSCH.